United States Patent Office 3,152,193
Patented Oct. 6, 1964

3,152,193
REACTIVATION OF CATALYST
Harold W. Fleming and William R. Gutmann, Louisville, Ky., assignors to Catalysts and Chemicals Inc., Louisville, Ky., a corporation of Delaware
No Drawing. Filed July 17, 1959, Ser. No. 827,691
2 Claims. (Cl. 260—677)

This invention relates to the reactivation of catalyst. More particularly the invention relates to the regeneration or reactivation of catalysts which contain as an essential active ingredient the sulfides of nickel and cobalt.

Various catalysts are used for the treatment of carbonaceous materials and particularly when used in the treatment of unsaturated hydrocarbons such as olefins, diolefins and acetylenes become deactivated during use. The length of time that a given catalyst can be employed before such deactivation becomes economically unattractive depends upon the nature and composition of the catalyst itself as well as the nature and composition of the material treated and the process conditions. This is partially due to different causes of the deactivation. However, in most cases, the major cause of deactivation is the deposition of carbonaceous deposits which cover the catalyst surface.

Catalysts of the oxide type as a general rule become deactivated in a relatively short period of time. In most cases the deactivation is usually primarily due to the formation of polymeric materials on the surface of the catalyst which can be removed by periodically burning off said deposits in the presence of steam and air. However, following each regeneration it is necessary to reduce the catalyst if the catalyst is to be used in a hydrogenation process. As a consequence, due to the frequency of regeneration that is required with most metal oxide catalyst, with concomitant loss of production and consumption of high temperature steam and hydrogen, the use of other catalysts which provide substantially continuous operation has been found advantageous. One of the major catalysts of this type comprises the sulfides of the iron group as the major catalytic constituent. These catalysts may as a rule be employed over a relatively long period of time without loss of activity. Nevertheless these catalysts do in time lose activity and must be either discarded, reactivated or regenerated. The regeneration procedure, when applied, generally involved burning the carbonaceous deposits from the catalyst with air diluted with steam as the first step, followed by reduction with hydrogen.

It has now been found that the catalysts comprising the sulfides of nickel and cobalt when applied to the process of selectively hydrogenating highly unsaturated impurities in olefin gas streams after regeneration become nonselective. By selectivity it will be understood that the major reaction concerned with such processes involves the hydrogenation of triple bonds, such as are found in acetylene, methyl acetylene, vinyl acetylene, etc., and double bonds as found in the highly unsaturated alpha beta diolefins, i.e., propadiene, 1-2 pentadiene, etc. For convenience herein these materials will be referred to as highly unsaturated impurities. In view of the fact that the highly unsaturated impurities are notorious polymer formers, the best catalysts are eventually coated with polymer, requiring a temperature increment at periodic intervals to effect satisfactory purification of the monoolefin streams. Thus, for example, in selectively hydrogenating acetylenes in a gas stream containing ethylene as the desired constituent, satisfactory operation can be initially carried out at a temperature of 250-350° F. and effect removal of the acetylenic impurities to the extent that less than 10 p.p.m. remain in the product gas. To maintain this level of removal, however, the temperature generally must be periodically raised after three to four weeks operation in about a 25 to 50° F. increment until the outlet temperature approaches 600° F. Since operation at temperatures in excess of around 600° F. begins to become non-selective in that excessive amounts of monoolefins are destroyed, the catalyst is then regenerated. In order to effectively remove the polymeric material deposited on the surface of the catalyst, the process gas is shut off and the catalyst is heated with steam to a temperature of around 700-800° F. for periods sufficient to remove the polymeric materials. This generally is for a period of about 10-24 hours. In the case of high boiling polymers, it is sometimes necessary to add a controlled amount of air to effectively burn off these materials.

An object of this invention, therefore, is to provide a method of regeneration and activation of the nickel sulfide and cobalt sulfide catalysts whereby the activity and selectivity of said catalysts are maintained.

A further object of this invention is to provide a method of regeneration of said catalyst which may be effected efficiently and economically.

Still another object of this invention is to prolong the useful process life of said catalysts.

Other important objects will be apparent from the detailed description and examples which appear hereinafter.

We have discovered that this treatment results in a nonselective catalyst. We have found that by treating the deactivated catalyst with steam to remove the polymer if the catalyst is then treated with a sulfiding agent such as hydrogen sulfide at a temperature in the range of from 700-800° F. without subsequent reduction with hydrogen, the catalyst is selective for further purification of olefin gases.

According to this invention it has been found that the conventional regeneration treatment with steam or steam and air produces an inactive catalyst unless the catalyst is subsequently reduced. While we do not wish to be bound by any theory or hypothesis in regard to this deactivation, it is believed that the removal of polymeric materials with steam or steam and air also converts a portion of the active metal sulfides to the more inactive oxides. We have found further that if the catalyst after steaming is reduced with hydrogen, that the catalyst is too active and as a result hydrogenates an excessive portion of the valuable monoolefins. However, by the process of the present invention, the catalyst, after being brought to a temperature of 600 to 800° F. in the polymer removal step, is treated with a sulfiding agent with the result that the catalyst is both active and selective for the desired reaction. Sulfiding agents, as used herein, include gaseous compounds of sulfur such as hydrogen sulfide, mercaptans, thiophenes, carbonyl sulfide, etc., however, for clarity and consistency the examples have been restricted to the use of hydrogen sulfide. Hydrogen sulfide is the most widely available gaseous compound of sulfur and as a result will be most applicable in the process of our invention, however, the use of other compounds of sulfur is by no means precluded. In many instances mixtures of the various compounds of sulfur are available from the processing of refinery gases and are suitable for use in the present invention. The temperature of the sulfiding step is somewhat critical and at any event should be at least 600° F. Normally it is in the range of 600-800° F., i.e., the temperature at which the catalyst is treated for removal of polymer. It will be understood, of course, that the temperature at which the polymer is removed will vary to some extent in relation to the frequency of regeneration and the type of polymer on the catalyst. Generally the accepted practice is to operate until the temperature level of the process approaches about 600° F. Since the nature of the polymer is dependent upon the nature of the raw material being treated and the temperature of operation, it will follow that the nature of the polymer deposited during the last stages of the process cycle is different from that deposited during the first stages of the process cycle. Secondly, if the highly unsaturated impurities are primarily three and four carbon chains rather than two carbon chains, the polymer deposited on the catalyst's surface is of a higher boiling nature than that derived from shorter chain materials. Generally speaking, in any event, a catalyst temperature in excess of 600° F. will be necessary for the removal of the polymeric deposits and the sulfiding step may be accomplished at this temperature by introducing the sulfur-bearing gas with the last portion of the stream, or after the steam has been cut off and the catalyst itself is still at temperature. If steam and air are used to eliminate the heavy polymer deposits, the gaseous sulfiding agent can not be introduced until after the air has been purged from the system since the air will react with the sulfiding agent to form either elemental sulfur or sulfur dioxide according to the well known reactions:

$$O_2 + 2H_2S = H_2O + SO_2$$
$$O_2 + 2H_2S = 2H_2O + S$$

and we have found that the metallic constituents of the catalyst will react better with sulfur bearing compounds than with elemental sulfur or sulfur dioxide. As a matter of practice and economy, it is normally advantageous to completely cut off the expensive high pressure steam after the major portion of the carbonaceous deposits has been removed from the catalyst's surface and introduce the sulfiding agent as a separate step. The number of moles of sulfiding agent used are equivalent to the number of moles of metal sulfide in the starting catalyst.

The following non-limiting examples are presented as illustrative of the invention:

EXAMPLE 1

50 cc. of a catalyst consisting essentially of the sulfides of nickel, cobalt and chromium on an inert carrier were taken from the top bed of a 2-bed reactor after operation for 135 days. The catalyst had been used to hydrogenate a gas stream containing about 30% ethylene, 12% propylene, 14% hydrogen and 1% acetylene and had operated successfully at an initial inlet temperature of about 275° F. After about two months of operation the catalyst was regenerated by treatment with steam and air at a temperature of about 750° F. and was then placed back into operation with the same gas mixture. After about a month's operation, due to a plant shutdown, the catalyst was again regenerated and the top bed was removed and inspected. Fifty cc. of this catalyst was charged to an isothermal bench scale reactor, which comprised an iron pipe 1″ in diameter and jacketed with a Dowtherm jacket. The catalyst was reduced at 750–825° F. for 7 hours and tested with a gas corresponding to the composition of the gas utilized with commercial installation, which consisted of:

| | Percent |
|---|---|
| Hydrogen | 14 |
| Ethylene | 30 |
| Propylene | 12 |
| Carbon monoxide | 2.5 |
| Carbon dioxide | 7 |
| Nitrogen | 7 |
| Oxygen | 1 |
| Methane | 25.5 |
| Acetylene | 1 |
| Water vapor | 6 |

This material was passed through the reactor at a pressure of 180 p.s.i.g. The following table indicates the non-selectivity of this catalyst.

*Table I*

| Temp., °F. | Pressure, p.s.i.g. | Space Velocity | Percent Water Vapor | Percent Ethylene Hydrogenated | Acetylene Out, p.p.m. |
|---|---|---|---|---|---|
| 360 | 180 | 800 | 6.0 | 2.3 | Greater than 1,000. |
| 450 | 180 | 800 | 6.0 | 18.0 | 19. |
| 360 | 180 | 1,500 | 6.0 | 5.6 | 27. |
| 360 | 180 | 800 | 6.0 | 9.5 | 9. |

It will be noted that in order to get proper elimination of the acetylenes an excessive amount of ethylene was hydrogenated. Doubling the space velocity and reducing the temperature lowered the loss of ethylene; however, it was still about 6%.

EXAMPLE 2

50 cc. of the same catalyst utilized in Example 1 was treated with steam to raise the temperature to about 700–800° F. Upon reaching this temperature 0.24 liter of hydrogen sulfide was passed through the catalyst bed. Utilizing the same gas composition and conditions as Example 1, the following table indicates the activity and selectivity of this catalyst.

*Table II*

| Temp., °F. | Pressure, p.s.i.g. | Space Velocity | Percent Water Vapor | Percent Ethylene Hydrogenated | Acetylene Out, p.p.m. |
|---|---|---|---|---|---|
| 440 | 180 | 800 | 6 | 0 | 20 |
| 440 | 180 | 800 | 6 | 0 | 16 |
| 450 | 180 | 800 | 6 | 0 | 8-10 |
| 465 | 180 | 800 | 6 | 0 | 5 |
| 425 | 180 | 800 | 6 | 0 | 20 |
| 445 | 180 | 800 | 6 | 0 | 8 |

It will be noted that in Example 1 the catalyst which was regenerated and reduced hydrogenated as much as 18% of the total ethylene in the gas composition whereas the catalyst of Example 2 after treatment in accordance with this invention hydrogenated only 1.5% of the ethylene at the same temperature. By lowering the temperature 10° the catalyst of Example 2 hydrogenated no ethylene, whereas lowering the temperature almost 100° with the catalyst of Example 1 decreased the hydrogenation of the ethylene by only about half so that there was an overall loss still in excess of 9%. Doubling the space velocity, the catalyst of Example 1 still hydrogenated over 5% of the ethylene.

EXAMPLE 3

Fifty cc. of a catalyst consisting of the sulfides of nickel, cobalt and chromium supported on an inert refractory (2.9% nickel, 0.53% cobalt and 0.07% chromium, all expressed as metals) had been tested in an isothermal bench scale unit for six days and the acetylene had been consistently lowered to a level of 0.5 p.p.m. in a gas containing the following:

| | |
|---|---|
| Hydrogen | 33.0 |
| Ethylene | 32.0 |
| Propylene | 1.0 |
| Butadiene | 0.5 |
| Carbon monoxide | 0.22 |
| Methane | 33.13 |
| Acetylene | 0.15 |

This catalyst was then steamed overnight and without reduction was tested under the identical conditions of the previous 6 day run. At a temperature of 360° F. and a pressure of 125 p.s.i.g. and a space velocity of 3000 there was no loss of ethylene but a leakage of acetylene of 300 parts per million.

Since the catalyst was insufficiently active, it was then reduced with hydrogen at a temperature of 750° F. overnight and tested the next morning with the same gas composition and under identical conditions. The acetylene was removed to a level of 0–5 p.p.m. but at 360° F. and a space velocity of 3000 the loss of ethylene was in the range of 6.5 to 7.5%.

It will be noted that after regeneration with steam the catalyst was insufficiently active without reduction with hydrogen. After the catalyst was reduced, it was found to be non-selective.

EXAMPLE 4

Another charge of catalyst of identical composition of that of Example 3 was tested three days utilizing the same gas composition and under identical conditions. Acetylene leakage was in the range of 3–7 p.p.m. and ethylene hydrogenated was in the range of 0.9 to 1.5%. The catalyst was steamed overnight at 725° F. and after steaming 0.24 liter of hydrogen sulfide was added. The catalyst was then tested and at a temperature of 360° F. the acetylene leakage was 15 p.p.m. with no loss of ethylene. At 400° F. acetylene leakage was cut to 4 p.p.m. with no loss of ethylene.

It is interesting to note that the catalyst after being regenerated according to the process of the present invention was more selective than it was prior to regeneration.

Comparing the regenerated catalyst with the steamed but unreduced catalyst of Example 3, it will be noted that this catalyst was much more active. Comparing it with the steamed and reduced catalyst of Example 3 it will be seen that the catalyst was much more selective.

While the examples have been restricted to the use of a specific catalyst for the sake of clarity and conciseness, catalysts consisting of cobalt sulfide by itself or nickel sulfide by itself are equally applicable to the process of this invention. Such catalysts are preferably supported on inert carriers such as brickware, pumice, commercial refractories, kaolin pellets, etc. In addition, the choice of the gaseous sulfiding agent may vary according to the material at hand but in most cases hydrogen sulfide is utilized because of its widespread availability. As a consequence the examples have been directed to the use of hydrogen sulfide as the sulfiding agent.

It will be apparent to those skilled in the art that a novel process for the activation and regeneration of catalysts utilized in the process of selectively hydrogenating unsaturated impurities in the presence of monoolefins has been disclosed. Since many charges may be made in the above process and catalyst without departing from the scope of the invention, it is intended that all matter contained in the above description shall be interpreted as illustrative and that the invention is to be construed broadly, and restricted solely by the appended claims.

We claim:

1. In a process of selective hydrogenation of acetylenes and diolefins to mono-olefins in a gas stream containing mono-olefins in the feed over a catalyst selected from the group consisting of supported nickel sulfide-cobalt sulfide catalyst and supported nickel sulfide-cobalt sulfide-chromium sulfide catalyst, at elevated temperature in the range of 250° F. to 600° F. and elevated pressures, between about 125 and 180 pounds per square inch gauge during which treatment the catalyst becomes progressively more non-selective and becomes fouled with polymer formed on the catalyst surface derived from said acetylenes and diolefins to lower the activity of said catalyst and to require higher temperatures to maintain the same activity, the improvement for regenerating said catalyst to restore its selectivity and activity to the condition as when the catalyst was freshly prepared consisting of the steps of shutting off the gas feed stream, first treating the catalyst with steam at a temperature of about 600° F. to about 1000° F. for a period of time sufficient to remove polymer deposited on said catalyst and thereafter sulfiding said catalyst with a sulfiding agent selected from the group consisting of hydrogen sulfide, mercaptans, thiophenes and carbonyl sulfide at a temperature of from 600° F. to 800° F. whereby the catalyst is made selective and activated in the absence of subsequent reduction with hydrogen.

2. The process of claim 1 in which the catalyst consists of from 2 to 5% by weight of nickel sulfide, 0.5 to 2% by weight of cobalt sulfide and 0.01 to 1% by weight of chromium sulfide supported on kaolin.

References Cited in the file of this patent
UNITED STATES PATENTS

| 2,398,175 | Cole | Apr. 9, 1946 |
| 2,402,493 | Greensfelder et al. | June 18, 1946 |
| 2,813,835 | Nozaki | Nov. 19, 1957 |